W. P. ROBINETT & J. A. GULLEDGE.
CAMERA ATTACHMENT.
APPLICATION FILED JAN. 12, 1915.

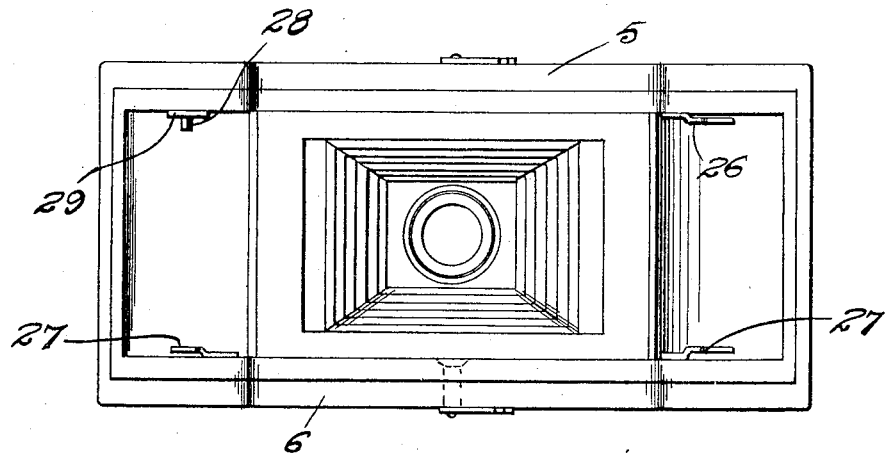
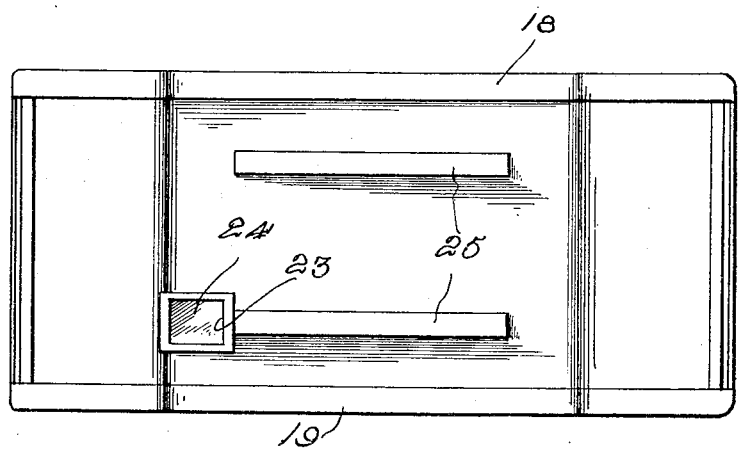
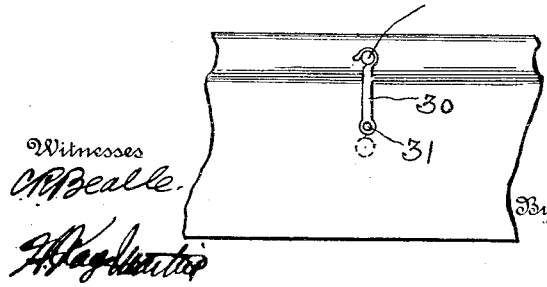

1,225,495.

Patented May 8, 1917.
2 SHEETS—SHEET 2.

Witnesses
Inventors
W. P. Robinett,
J. A. Gulledge.

UNITED STATES PATENT OFFICE.

WILLIAM P. ROBINETT AND JAMES A. GULLEDGE, OF MALDEN, MISSOURI.

CAMERA ATTACHMENT.

1,225,495. Specification of Letters Patent. Patented May 8, 1917.

Application filed January 12, 1915. Serial No. 1,852.

*To all whom it may concern:*

Be it known that we, W. P. ROBINETT and J. A. GULLEDGE, citizens of the United States, residing at Malden, in the county of Dunklin and State of Missouri, have invented certain new and useful Improvements in Camera Attachments; and we do hereby declare the following to be a full, clear, and exact description of the invention, such as will enable others skilled in the art to which it appertains to make and use the same.

This invention relates to new and useful improvements in camera attachments, and has for its principal object to provide a device which is adapted to be used in connection with plate cameras in order that the same may be placed in such condition as to enable the user to use films instead of plates.

Another object of the invention is to provide a device which may be easily and quickly attached to a camera of the ordinary construction without changing the same in any way.

A still further object of the invention is to provide a device which is easily accessible thus enabling the user to easily and quickly load and unload the camera.

Figure 3:
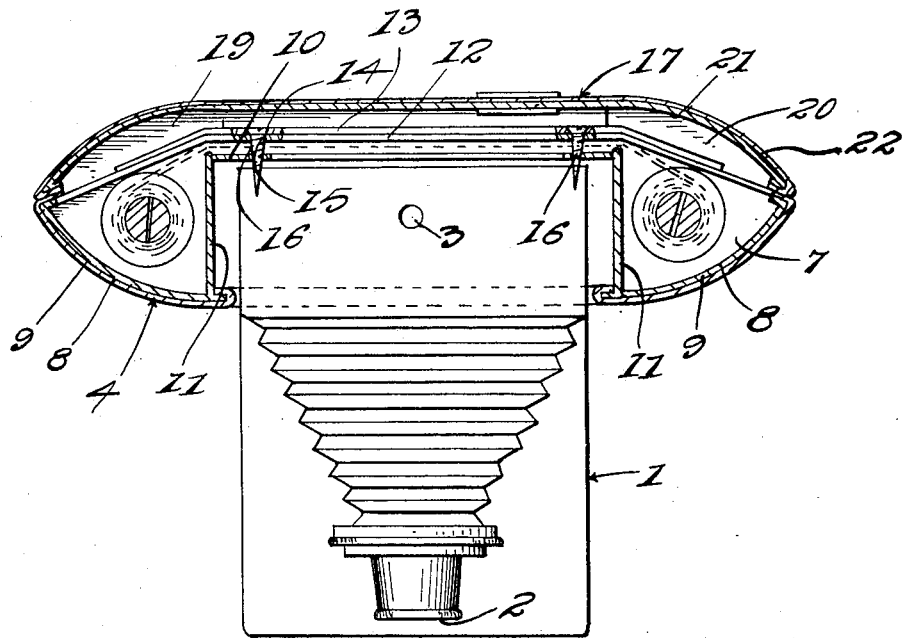
Figure 4:
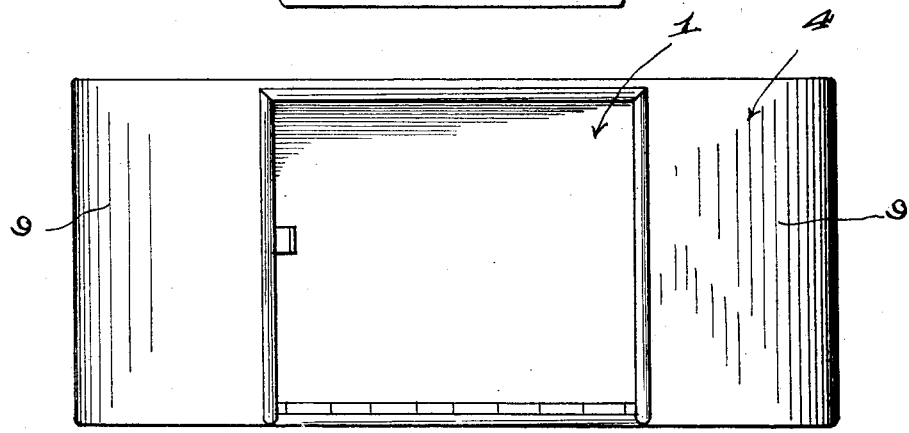

With these and other objects in view, the invention consists in the novel combination and arrangement of parts which will be fully set forth in the following specification and accompanying drawings, in which Figure 1 is a rear view of a camera showing our improved attachment applied thereto, Fig. 2 is an interior view of the attachment cover, Fig. 3 is a horizontal sectional view showing the attachment in place on the camera, Fig. 4 is a front view in elevation of the attachment showing the camera in place therein and in its folded position, and Fig. 5 is a detail view of the hook for holding the cover plate of the attachment in place.

Referring now to the drawings, by characters of reference, the numeral 1 designates as an entirety a camera of the ordinary plate type provided with the usual lens 2. This camera is also provided with the ordinary internally screw threaded recess 3 for attachment to the tripod, as clearly shown in Fig. 3.

The attachment comprises a body or casing, designated generally by the numeral 4, and including the top and bottom, 5 and 6, respectively, which are provided at each end with the enlargement 7, as clearly shown in Fig. 3. These enlargements 7 are substantially triangular in plan, and one edge thereof is rounded as at 8 and forms a support for the curved wall 9 forming the front wall of the film chambers, which will be more fully hereinafter described.

Suitable inner walls 11 are arranged along one of the adjacent sides of the triangle 7 and these walls face each other and form a receptacle in which the camera 1 rests. A suitable fibrous mask 10 is secured between the top and bottom walls and the walls 11, and this mask is provided with a central opening the size of the picture which is to be taken. Suitable strips 12 connect the ends of the attachment and are provided with the reinforcing strips 13 which are provided with countersinks 14 which countersinks aline with suitable apertures 15 formed in the strips 12 and are arranged to receive the screws 16, which screws extend therethrough and into the camera to hold the attachment in place thereon.

The cover of the attachment designated generally by the numeral 17 comprises the top and bottom walls, 18 and 19, respectively, which are provided at their ends with the angular extensions 20 having the arcuate outer edges 21 to which the rear wall 22 is secured. This rear wall extends throughout the entire length of the cover and is provided with a suitable opening 23 in which the ruby screen 24 which may be of celluloid, glass or other suitable material is secured. The outer ends of the rear wall 22 are turned inwardly, as indicated at 22$^a$, and engage the inwardly turned edges 9$^a$ of the walls 9, thereby increasing the area of the bearing surfaces of the body member and cover 17 therefor and insuring against the admission of light. This cover is provided with a pair of spaced guides 25 which are designed to hold the film flat to avoid danger of the same becoming curved and spoiling the picture. The inner edges of the angular extensions 20 are inclined so as to register with the edges of the extensions 7 and thereby form a light tight joint.

Secured to the top and bottom walls of the attachment are the springs 26 and 27, respectively, which are located in the roll chambers and these springs are designed to hold the rolls in proper position therein.

In order to turn the films, one of the roll chambers communicates with the exterior by an aperture, through which the rectangular stem 28 extends. This stem 28 is provided with the cross bar 29 which is designed to engage in the groove formed in the ends of the reels. A suitable key or thumb piece is formed on the outer end of the stem 28 and is designed to provide means whereby the user may rotate the stem.

In order that the device may be easily and quickly opened or closed to load or unload, there is provided a hook 30 which is pivoted as at 31 to the attachment and the hooked end thereof is designed to engage the lug 32 carried by the cover. These hooks and lugs may be arranged in any suitable position, but as shown in the drawings, are located centrally of the longitudinal extremities of the device, thus insuring the proper positioning of the several parts.

It will be apparent from the foregoing that in use, the camera is inserted through the front opening in the device and secured therein by inserting the screws 16 through the openings 15 and tightening the same into the camera. The user may then load the device in the usual way and the films passing in the rear of the mask 10 will be in the same position as if the camera were using plates. Due to this fact that the guides 25 are provided, it will be apparent that the film pressing thereagainst will be held in proper position with relation to the lens 2 of the camera thereby producing the same effect as if the plates were used and permitting the device to adapt a plate camera to the use of films.

While in the foregoing there has been shown and described the preferred embodiment of this invention, it is to be understood that such changes may be made in the combination and arrangement of parts as will fall within the spirit and scope of the invention as defined in the appended claim.

What is claimed is:—

A camera attachment including a casing comprising top, bottom, front and inner walls, said inner walls connecting the top and bottom walls intermediate their ends and being arranged in spaced relation to cooperate with the top and bottom walls to receive a camera, the outer ends of the front walls being directed inwardly, a mask secured to the top, bottom and inner walls adapted to engage a camera back and having an exposure opening therein, means to secure said mask to a camera back, and a cover removably secured to said casing, said cover including top and bottom walls engaged with the top and bottom walls of the casing, and a rear wall having inwardly turned edges snugly fitting against the inwardly turned edges of the front walls.

In testimony whereof we affix our signatures in presence of two witnesses.

WILLIAM P. ROBINETT.
JAMES A. GULLEDGE.

Witnesses:
JAMES BARBER,
THOS. K. WILLIAMS.

Copies of this patent may be obtained for five cents each, by addressing the "Commissioner of Patents, Washington, D. C."